US007116676B2

(12) United States Patent
Laurent

(10) Patent No.: US 7,116,676 B2
(45) Date of Patent: Oct. 3, 2006

(54) RADIO BROADCASTING SYSTEM AND METHOD PROVIDING CONTINUITY OF SERVICE

(75) Inventor: Pierre-André Laurent, Bessancourt (FR)

(73) Assignee: Thales, Paris (FR)

( * ) Notice: Subject to any disclaimer, the term of this patent is extended or adjusted under 35 U.S.C. 154(b) by 939 days.

(21) Appl. No.: 09/976,155

(22) Filed: Oct. 15, 2001

(65) Prior Publication Data

US 2002/0054609 A1 May 9, 2002

(30) Foreign Application Priority Data

Oct. 13, 2000 (FR) .................................. 00 13157

(51) Int. Cl.
*H04J 4/00* (2006.01)
(52) U.S. Cl. ....................... 370/436; 370/478; 378/147
(58) Field of Classification Search ................ 370/203, 370/204, 205, 206, 207, 208, 210
See application file for complete search history.

(56) References Cited

U.S. PATENT DOCUMENTS

| 5,243,685 A | 9/1993 | Laurent |
| 5,522,009 A | 5/1996 | Laurent |
| 5,584,051 A * | 12/1996 | Goken ........................... 455/68 |
| 5,745,525 A * | 4/1998 | Hunsinger et al. ........... 375/285 |
| 5,949,813 A * | 9/1999 | Hunsinger et al. ........... 375/142 |
| 6,005,894 A * | 12/1999 | Kumar ......................... 375/270 |
| 6,014,407 A * | 1/2000 | Hunsinger et al. ........... 375/140 |
| 6,016,469 A | 1/2000 | Laurent |
| 6,563,880 B1 * | 5/2003 | Hunsinger et al. ........... 375/260 |
| 6,661,771 B1 * | 12/2003 | Cupo et al. .................. 370/204 |
| 2001/0024475 A1 * | 9/2001 | Kumar ........................ 375/270 |

FOREIGN PATENT DOCUMENTS

| EP | 1 041 766 | 10/2000 |
| FR | 2 721 461 | 12/1995 |
| WO | WO 99/20007 | 4/1999 |
| WO | WO 99/50982 | 10/1999 |
| WO | WO 00/51272 | 8/2000 |

* cited by examiner

*Primary Examiner*—Bob A. Phunkulh
(74) *Attorney, Agent, or Firm*—Oblon, Spivak, McClelland, Maier & Neustadt, P.C.

(57) ABSTRACT

A system and method to provide continuity of service in a radio broadcasting system, wherein the radio broadcasting system includes at least one modem using the COFDM technique, and transmits N time-frequency cells modulated independently of one another. A number $N_1$ of cells conveying digital audio signal $S_1$ and a number $N_2$ of cells conveying analog audio signal $S_2$ are transmitted to a receiver. When the receiver cannot decode the signal in the $N_1$ cells, the receiver replaces the digitized audio signal $S_1$ with the analog signal $S_2$.

11 Claims, 3 Drawing Sheets

RADIO BROADCASTING SYSTEM AND METHOD PROVIDING CONTINUITY OF SERVICE

BACKGROUND OF THE INVENTION

1. Field of the Invention

The present invention relates to a method of radio broadcasting providing continuity of service and a system implementing the method.

Hitherto, narrow-band radio broadcasting systems have used purely analog modulation methods such as amplitude modulation, frequency modulation or single sideband modulation. The last-named modulation is rarely used.

In the near future, radio broadcasting systems known as "digital" systems are going to be standardized. These systems are designed for use in the bands located below the 30 MHz band, and will comply with existing channels, most usually having bandwidths of 9 kHz or 10 kHz.

Although these systems give high-quality, crystal-clear sound, they are handicapped by a phenomenon inevitably linked to digital methods, namely the total disappearance of the audio signal when the reception conditions are poor, for example excessively severe frequency-selective fading or flat fading, a generally inadequate signal-to-noise ratio, interference, etc. This is not the case for amplitude modulation transmission, for example for which, even at very low signal-to-noise ratios, the sound remains intelligible although highly noise-infested and/or distorted, a feature to which the faithful listeners of this type of broadcast are accustomed.

2. Description of the Prior Art

Various advanced methods have been proposed to overcome this problem at least partially.

One of these methods is the UEP (unequal error protection) method in which the bit stream is divided into two parts as follows:

- a specially protected part, which may be received with a lower signal-to-ratio than the remainder and conveys a bit stream that is sufficient to regenerate lower quality audio conditions but is deemed to be sufficient to provide minimum continuity of service,
- an unprotected part which, when it is properly received, gives the quality of the frequency audio signal referred to here above.

However, a method of this kind always has the above-mentioned drawback because, when the signal-to-noise ratio is too low, the audio signal is quite simply cut off.

An object of the present invention relates to a method and system of radio broadcasting adapted to ensuring total or almost total continuity of reception whatever the conditions.

A system of this kind is called a permanent audio link (PAL).

SUMMARY OF THE INVENTION

The invention relates to a method used to provide continuity of service in a radio broadcasting system comprising at least one modem using the COFDM technique comprising the transmission of N time-frequency cells modulated independently of one another. It comprises at least the following steps;

at transmission:
a) sending a number $N_1$ of cells conveying signals needed for the transmission of a digitized audio signal $S_1$,
b) sending a number $N_2$ of modulated cells to transmit an analog signal $S_2$ of analog audio samples, at reception:
c) when the signals of the $N_1$ cells cannot be decoded, replacing the digitized audio signal $S_1$ by the analog signal $S_2$ conveyed by the cells $N_2$.

The method comprises for example, at transmission, one or more pre-processing steps such as lowpass filtering and/or sampling and/or the introduction of a delay for the signal $S_2$ consisting of analog samples so that the delays of the signals $S_1$ and $S_2$ are substantially identical at output of the receiver.

According to one embodiment, the method comprises for example, at reception, a step to separate at least the signal $S_1$ from the signal $S_2$ and a step for validating the signal $S_1$ in decodable or non-decodable form performed before the step c) and at least one step for post-processing the signal $S_2$ such as the rejection of background noise.

The proportion of cells $N_1$ for a passband of about 10 kHz may range from 50% to 80% of the quantity N of available cells.

The invention also relates to a radio broadcasting system comprising at least one modem using the COFDM technique, said modem being represented in a time-frequency space by several elementary cells comprising N available cells, at least one transmitter and at least one receiver. It comprises at least one of the following elements:

at the transmitter:
  a device adapted to distributing the signals needed for the transmission of a digitized audio signal $S_1$ in a number $N_1$ of coils and analog audio signals $S_2$ in a number $N_2$ of cells before their transmission, at the receiver:
  a device for the differentiation, in the received signal Sr, of at least the digitized audio signal $S_1$ from the signal $S_2$,
  a device adapted to "qualify" the signal $S_1$ in decodable or non-decodable form,
  a device to replace the signal $S_1$ which is not audible by the analog signal $S_2$.

The object of the present invention in particular has the following advantages:
  it provides continuity of service for all reception conditions, unlike a purely digital method,
  there is no change in the frequency spectrum of the signal transmitted, which means that there is no additional difficulty especially in neighboring channels,
  it provides simplicity of implementation and non-implementation when the conditions are right,
  it gives the possibility of adding ancillary methods to improve the quality of the analog signal at reception, which indeed entails no difficulty since system already comprises a majority of elaborate digital processing operations,
  the quality of the audio signal at reception, unlike that of standard AM (amplitude modulation) reception, remains constant, for a given signal-to-noise ratio resulting especially in:
    an absence of coloring due to selective fading by compensation of channel gain,
    an absence of distortion due to the disappearance of the carrier, for there is no carrier,
    a decorrelation of the disturbances due to interference, through the interlacing which makes their effect similar to that of pulse noise hence to flat spectrum signals.

BRIEF DESCRIPTION OF THE DRAWINGS

Other features and advantages shall appear from the following detailed description of an embodiment taken as a non-restrictive example and illustrated by the appended drawings, of which.

MORE DETAILED DESCRIPTION

For a clearer understanding of the invention, the description, which is given by way of an illustration that in no way restricts the scope of the invention, relates to a system designed for use with a COFDM (coherent orthogonal frequency division multiplex) type modem (modulator-demodulator). This modem may be described as a juxtaposition throughout the transmission band, of a multitude of elementary narrow-band modems, for example several hundreds of elementary narrow-band modems.

Figure 1:
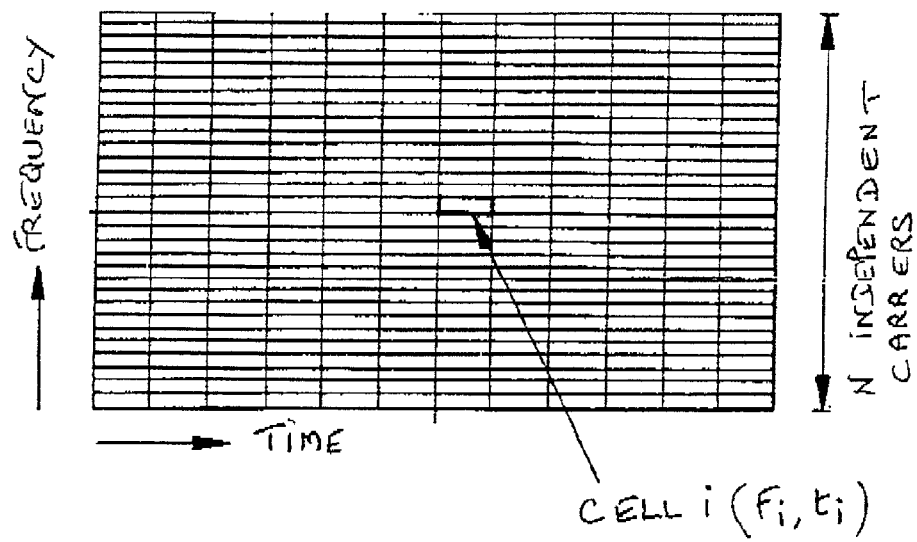
FIG. 1 is a drawing of a modem in a time-frequency space.

FIG. 1 represents one way of describing such a modem. This figure considers a two-dimensional space, namely a time (X-axis) and frequency (Y-axis) space; divided into independent elementary cells each of them characterized by a given frequency Fi and a given point in time ti, i being the index of the cell.

A cell with an index i is associated with a complex number that corresponds directly to the amplitude A(t) and the phase φ(t) assigned to it by the modulator. The modulated signal S(t) is equal to A(t)cos(ωt+φ(t)).

The elementary cells may have different functions or roles, for example:
1) some of them have a fixed content known to the receiver. They are used for various necessary synchronizations such as time synchronization, frequency synchronization as well as the continuous assessment of the characteristics of the channel which may vary with time, for example characteristics such as the complex gain as a function of the frequency (essentially as a function of the characteristics of the transmission channel, the signal-to-noise ratio at each frequency, the latter possibly varying as a function of the level of the signal received but also because of interferences, etc.,
2) other cells have a utilitarian role. They contain all the information used by the receiver to determine the characteristics of the signal that it is in the process of receiving, the type of audio encoder used, the transmission station, the list of frequencies at which it can receive the same station in the event of deterioration of reception, etc.,
3) all the other cells, generally the large majority, are available and used to transmit free binary information, most of which, in this type of application, corresponds to a digitized frequency audio signal. It is these available cells or free cells that will be used to implement the method according to the invention.

Figure 2:
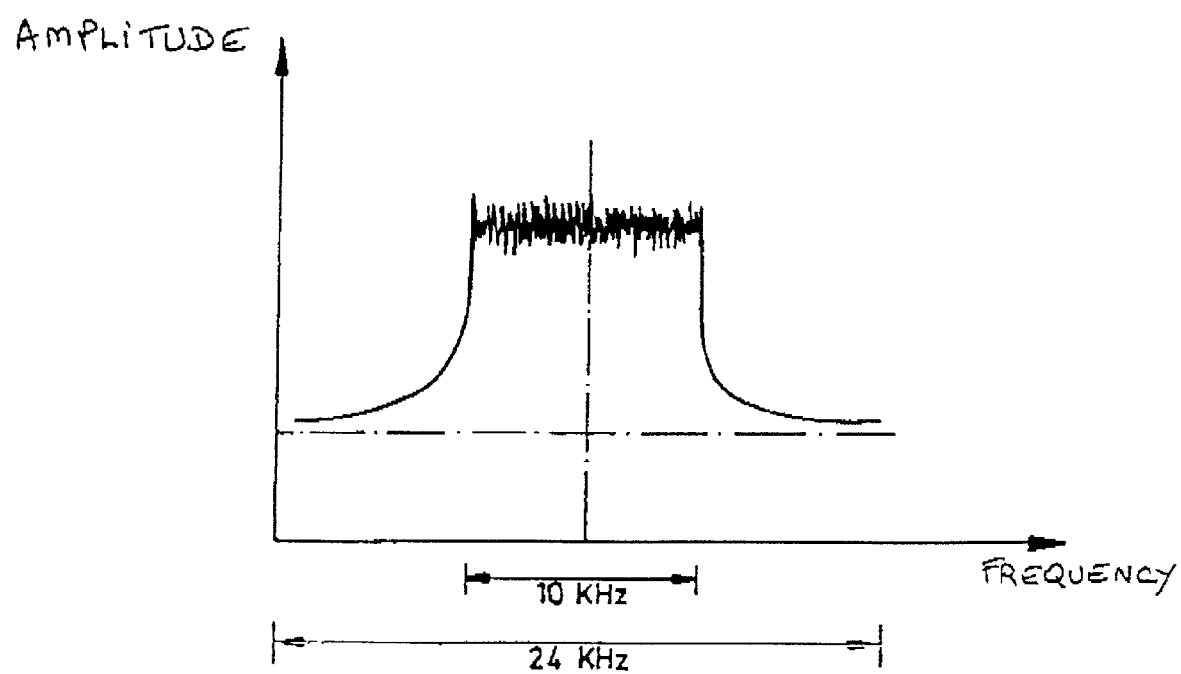
FIG. 2 shows the frequency spectrum of a signal received in a channel.

All these signals are distributed as uniformly as possible in the allocated frequency band or channel so much so that the frequency spectrum of the signal received is generally almost flat in the band as can be seen in FIG. 2 in an amplitude-frequency graph.

The free cells are usually modulated by a quadrature amplitude modulation (QAM) signal for which there is defined a finite and fixed number of complex known values to be used as a function of the bit stream to be transmitted.

Figure 3:
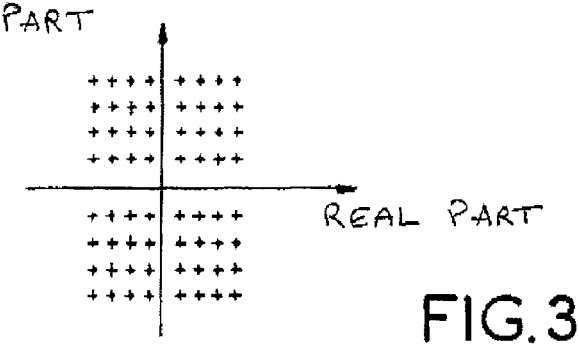
FIG. 3 corresponds to a representation in a complex plane of a QAM modulation.

FIG. 3 shows the case of a 64 QAM modulation for which 64 different points can be used in the complex plane. The totality of these points distributed in a diagram where the X-axis corresponds to the real part and the Y-axis to the imaginary part is called a constellation. This corresponds to the transmission of six information bits per cell, the value 64 being equal to $2^6$ possible cases.

It must be noted that, if the 6 bits in the example given were all free, this would correspond, without counting the useful signals, to a spectral efficiency of 6 bits per second per Hz of bandwidth, namely 60 Kbit/s in a 10 kHz channel.

In practice, it is necessary to use one form or other of the "channel encoding" method known to those skilled in the art. Channel encoding consists in adding bits known as redundancy bits to the free information bits forming the useful bit rate. These redundancy bits are used to correct the transmission errors.

If we take account of the utility signals, the spectral efficiency is in the range of 3 bits/second per Hz, representing 30 useful Kbits/second in a 10 kHz channel. This value can be compared with the 1 bit/sec per Hz in certain systems such as the digital audio broadcasting (DAB) system which gives only 10 Kbits/s in a 10 kHz channel.

Furthermore, when the transmission channel is unstable, which is frequent in short-wave broadcasting, or at night in medium wave broadcasting interlacing methods are still used. These methods consist in transmitting the cells, not in their natural order of appearance, for example in the rising order of instants of transmission and, at a given time, in the rising order of frequencies but rather in dispersing them in the time/frequency space (FIG. 1) in such a way that the two initially consecutive cells (index i and (i+1)) are transmitted with a temporal and frequency separation that is as great as possible so that the disturbances to which they are subjected are as decorrelated as possible.

The interlacing methods are highly efficient. They are universally used in all transmission/broadcasting operations where the channel is not stationary, namely where the channel does not how a gain or constant noise whatever the frequency or the point in time considered.

The system and method that are the object of the present invention are based on the following principles which are implemented especially when the propagation forecasts indicate that the reception of the audio signal has a high likelihood of being disturbed:

using a major fraction $N_1$ of the N free or available cells to transmit an audio signal of "sufficient digital quality", using the remaining cells $N_2$ to transmit an "analog" version of the audio signal, upon reception, if it is not possible to decode the digital audio signal correctly, replacing it by the analog audio signal to ensure continuity of service.

The numbers $N_1$ and $N_2$ are for example chosen as a function of the desired quality of the analog signal $S_2$ of the standby channel. The value of $N_2$ depends for example on the bandwidth. For a bandwidth of about 10 kHz, $N_1$ varies for example between 50% and 75% of the value or N. For a greater bandwidth, this fraction may be smaller, and the criterion to be met is always that of the "sufficient quality"

of the analog signal received which could, as the case may be, replace the non-decodable digital audio signal.

Transmitter

Figure 4:
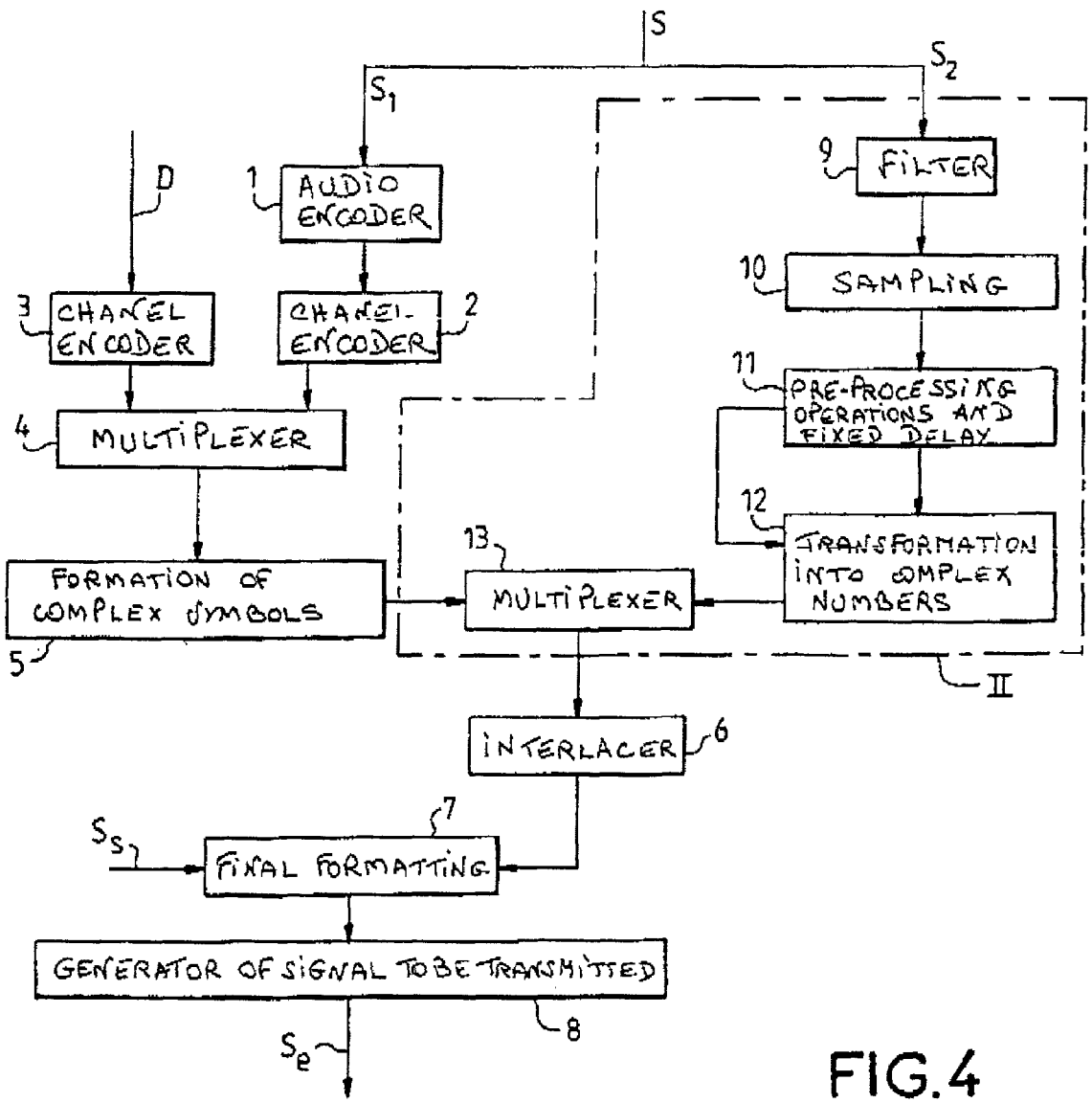
FIG. 4 is a block diagram of the means implemented in the transmission.

FIG. 4 is a full block diagram of the elements to be implemented at transmission as well as the steps for processing the corresponding signal. The means comprise a part I used normally for digital transmission and an added part II corresponding to the invention, indicated by dashes in the figure. In the figure, the letter D designates the appended data to be transmitted to the audio signal and the letter S designates the audio signal separated, for example, into two parts $S_1$ and $S_2$ with $S_2$ corresponding to the analog signal used to replace the inaudible digital audio signal.

Standard part I

The standard part, in its simplest version for example, contains:

- a first audio encoder 1 which from the audio signal $S_1$ to be transmitted, uses a standard audio encoding method to generate a bit stream known as a "digital audio signal",
- a first channel encoder 2 connected to the first audio encoder 1 which takes responsibility for the addition, to the bit stream, called the "digital audio" bit stream, of the redundancy bits-designed to increase resistance to transmission errors,
- a second channel encoder 3 which adds redundancy to the appended bit streams D which are added to the audio signal; these bit streams corresponding for example to utility data and/or other intrinsically digital data to be transmitted such as files, images, etc.,
- a multiplexer 4 which takes responsibility for forming a composite bit stream by mixing the audio signal coming from the channel encoder 2 and the data coming from the channel encoder 3,
- a system 5 for the formation of complex signals which, from the composite bit stream, forms the symbols to be transmitted; the pairs, namely the real part and the imaginary part, corresponding to the points of the constellations (FIG. 3) to be transmitted,
- an interlacer 6 having the role of dispersing the complex points in the time-frequency space in order to limit the effect of the error packets during reception, the interlacer receiving the signals coming from the multiplexer 13 described here above,
- a final formatting system 7 that complements the complex signals positioned by the interlacer with reference signals Ss enabling the receiver to carry out a quick and efficient synchronization as well as to follow the development of the complex gain of the transmission channel,
- a device a for generating the signal to be transmitted which, from all the complex signals that were hitherto in the frequency field, generated the time signal, for example by carrying out an inverse discrete Fourier transform, adds guard signals and performs various post-processing operations such as clipping, filtering, etc.,
- the temporal signal Se coming from the generation device 8 is transmitted to the transmitter.

Part II Comprising the Elements or Means Used to Implement the Invention

This part receives especially the fraction $S_1$ of the audio signal designated by the expression "standby audio signal" taken for use as an analog signal $S_2$ replacing the non-decodable digital audio signal $S_1$ at the receiver:

- a lowpass filter 9 designed to limit the pass-band of the standby audio signal $S_2$ to be transmitted whose quality need not be as good as that of the normal audio signal,
- a sampling signal 10 for the sampling of the filtered audio signal $S_2$ coming from 9; this signal must be sampled at a frequency ensuring a passband sufficient to prevent any loss in intelligibility. This sets a minimum number of cells of the modem to be assigned to this function. A reduced frequency, for example ranging from 4 kHz and 8 kHz, may be sufficient,
- an adapted device 11 to perform various simple pre-processing operations such as:
  - pre-accentuation or again more complex processing operations for example non-linear distortion or Lin-CompEx, a method where the signal undergoes dynamic compression and is transmitted along with robust bit stream (appended data) describing the state of compression,
  - the introduction of a fixed delay in the signal $S_2$. Indeed, in every case, the digitized audio signal undergoes a fixed delay corresponding to the delay of the digital audio so that, on the receiver side, the analog audio signal $S_2$ and the digital audio signal $S_1$ are synchronous so as not to disturb listening quality during any switching operations that may be performed during the reception of the signal. When there are no appended data, the audio signal contains 2 Na real samples if Na cells have been reserved-or it. Should the audio signal comprise B appended data bits, it will contain 2 Na-B/2 samples for example.

A device 12 adapted to the conversion of the real audio samples or binary audio samples for example as follows:

- two successive audio samples S(2n) and S(2n+1) respectively form the real part and the imaginary part of the nth complex samples,
- two successive bits, if necessary B(2p) and B(2p+1), respectively form the real part and the imaginary part of the pth complex sample, a bit 0 corresponding to a value of S and a bit 1 to a value of S (S is especially great as it is sought to make these information elements more robust).

A multiplexer 13 which takes responsibility for inserting the complex values generated by the device 12 among those coming from the device 5 for the shaping of complex symbols which, for their part, can take only a limited number of values (points chosen in the constellations). This insertion must imperatively be done before the final interlacing performed in the interlacer 6, so that the audio signal benefits from advantages identical or similar to those of the purely digital signal in terms of decorrelation of the noise and destructuring of the interference. It is also indispensable in order that the signal may keep a flat frequency spectrum identical to that of the purely digital signal (FIG. 2). At the output of the interlacer, the signals are transmitted to the final formatting device and then transmitted to the transmitter.

Receiver

Figure 5:
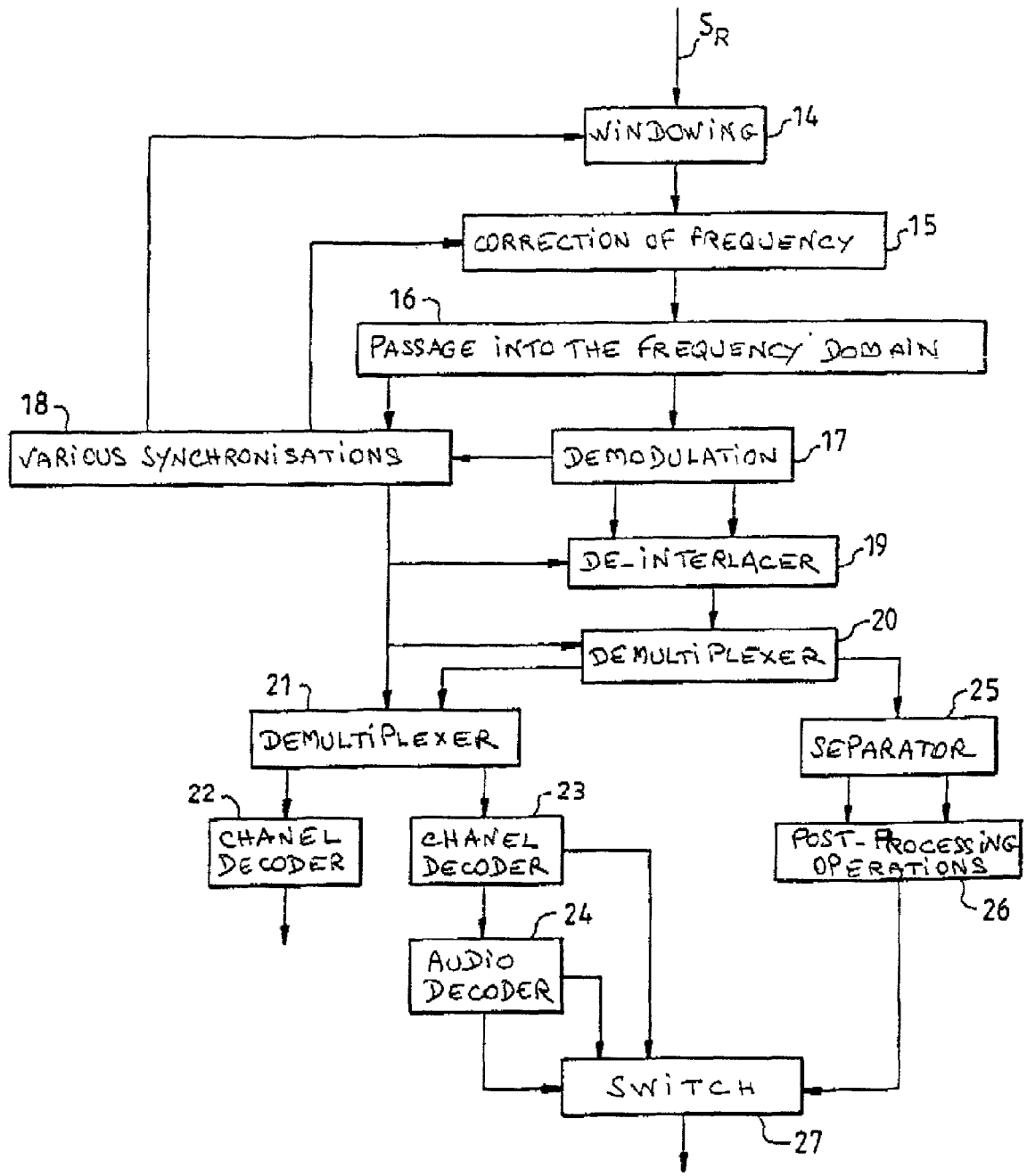
FIG. 5 is a simplified block diagram of the receiver according to the invention.

FIG. 5 shows a simplified block diagram of an embodiment of a receiver adapted to implementing the method according to the invention.

It is assumed that the received signal Sr has already undergone all the standard reception processing operations, for example the amplification step, the filtering operations, the automatic gain control (AGC), and the passage into baseband operation. It takes the form of complex temporal samples.

The receiver comprises especially the means needed to implement the following different steps of the reception processing:

The windowing 14
  a device performs the windowing in which a part supposed to be stable is taken from the received signal Sr. This is a part where all the replicas of the received signal are present simultaneously, each replica having its own delay, its own phase and its own amplitude. This is characteristic of the transmission channels in the frequency bands used and corresponds to the phenomenon which is well known as the multiple-path phenomenon, the frequency correction 15
  this correction is designed to compensate for the frequency drifts of the transmitters and the receivers as well as for any Doppler shift due to a variation in the transmitter/receiver distance and a time/frequency shift that is the mean for all the paths received, the passage into the frequency domain 16
  this is done by a discrete Fourier transform for example, the coherent demodulation 17 and synchronizations 18 which are implemented together for example in order to:
  properly estimate the residual frequency shift to be compensated for,
  accurately position the reception window,
  make an estimation, for each output complex sample, of its complex value such as it was at transmission (standardized complex value after estimation and compensation for the complex gain of the channel) as well as its signal-to-noise ratio which depends both on the time (non-stationary channel) and the frequency (frequency selective channel, the presence of interference in bands that are more or less narrow), de-interlacing 19
  it replaces the original complex samples in the original order, these samples being accompanied by the estimated signal-to-noise ratio, a first demultiplexing, by the demultiplexer 20, which separates the purely digital samples from those assigned to the standby link known as an analog link $S_2$, a second demultiplexing by the demultiplexer 21 which makes a separation, in the stream of purely "digital" samples, between the audio signal $S_1$ and the purely digital data D, a decoding step, by the decoder 22, which uses the redundancy to eliminate the residual errors in the purely "digital" data, a decoding step, by the decoder 23, which uses the redundancy to eliminate the residual errors in the bit stream representing the digital audio signal $S_1$; in addition to the "purely" digital bit stream, the decoder 23 determines the cases where the decoder has failed, for example when the quantity of errors is excessively great (it sends this information to the switching device 27 described here below), an audio decoding by the decoder 24 which finally reconstitutes the audio signal from the associated bit stream. This decoder 24 is also capable, by means of parity control systems for example, of detecting residual errors in the input bit stream, a separation step by the device 25 capable of separating the control data of the analog audio signals from the analog audio signal $S_2$, the bits and the samples coming from the separation step are for example subjected to a post-processing operation by means of an adapter device 28. These post-processing operations if necessary make use of the control data and perform processing operations in reverse to those performed at the transmission described hero above as well as other processing operations such as the rejection of background noise. Indeed, through the interlacing and compensation for the gain of the channel performed by the demodulator 24, the signal level does not vary with the gain of the channel unlike a standard AM type transmission and, furthermore, the additional noise is almost flat in the short term, namely it is uniformly distributed in the audio band (white noise) and can easily be estimated and reduced if not eliminated by standard methods such as spectral subtraction for example, a switching step, by the switch 27, which
  receives the digital audio signal $S_1$ coming from the audio decoder 24 and the standby audio signal $S_2$ as well as information on the possibility of decoding or not decoding the signal $S_1$; and
  when the signal $S_1$ cannot be decoded, for example following the detection of the impossibility of connecting the excessively numerous errors that affect it (namely information coming from the channel decoder 23 or the detection of residual errors, information coming from the audio decoder etc.) replaces the signal $S_1$ which cannot be decoded by the analog signal $S_2$.

What is claimed is:

1. A method to provide continuity of service in a radio broadcasting system, wherein the radio broadcast system includes at least one modem using a COFDM technique, and said radio broadcasting system is configured to transmit N time frequency cells modulated independently of one another, the method comprising:
  at transmission,
    sending a number $N_1$ of cells conveying signals for transmission of a digitized audio signal $S_1$, and
    sending a number $N_2$ of cells conveying signals for transmission of an analog signal $S_2$;
  at reception,
    differentiating, in a received signal Sr, between at least the digitized audio signal $S_1$ and the analog signal $S_2$;
    replacing the digitized audio signal $S_1$ by the analog signal $S_2$ conveyed by the cells $N_2$ when the signals of the $N_1$ cells cannot be decoded,
  wherein a proportion of cells $N_1$ for a passband of about 10 kHz ranges from 50% to 80% of a quantity N of available cells.

2. A method to provide continuity of service in a radio broadcasting system, wherein the radio broadcast system includes at least one modem using a COFDM technique, and said radio broadcasting system is configured to transmit N time frequency cells modulated independently of one another, the method comprising:
  at transmission,
    sending a number $N_1$ of cells conveying signals for transmission of a digitized audio signal $S_1$, and
    sending a number $N_2$ of cells conveying signals for transmission of an analog signal $S_2$;

at reception,
replacing the digitized audio signal $S_1$ by the analog signal $S_2$ conveyed by the cells $N_2$, when the signals of the $N_1$ cells cannot be decoded, wherein
at transmission, one or more preprocessing steps are performed, including introducing a delay for the analog signal $S_2$.

3. The method according to claim 2, further comprising compressing the dynamic range before introducing the delay for the analog signal $S_2$.

4. The method according to claim 2, further comprising:
at reception, separating at least the digitized audio signal $S_1$ from the signal analog $S_2$; and
performing validation of the digitized audio signal $S_1$ in decodable or non-decodable form before the replacing step.

5. The method according to claim 2, further comprising:
at reception, post-processing the analog signal $S_2$, wherein said post-processing includes at least rejecting background noise.

6. The method as in any one of claims 2 to 5, wherein a proportion of cells $N_1$ for a passband of about 10 kHz ranges from 50% to 80% of a quantity N of available cells.

7. A radio broadcasting system including at least one modem using a COFDM technique, said modem being represented in a time frequency space by several elementary cells comprising N available cells, wherein the system comprises:
a transmitter, wherein said transmitter includes,
a device configured to distribute signals for transmission of a digitized audio signal $S_1$ in a number $N_1$ of cells and signals for the transmission of analog audio signals $S_2$ in a number $N_2$ of cells; and
a device configured to obtain a compression of a dynamic range of the analog audio signal $S_2$,
a receiver, wherein said receiver includes,
a device configured to differentiate, in a received signal Sr, between at least the digitized audio signal $S_1$ and the analog audio signal $S_2$,
a device configured to determine if the digitized audio signal $S_1$ is in decodable form, and
a device configured to replace the digitized audio signal $S_1$, which is not in decodable form, with the analog audio signal $S_2$.

8. A radio broadcasting system comprising including at least one modem using a COFDM technique, said modem being represented in a time frequency space by several elementary cells comprising N available cells, at least one transmitter and at least one receiver, wherein the system comprises at least one of the following elements:
a transmitter, wherein said transmitter includes,
a device configured to distribute signals for transmission of a digitized audio signal $S_1$ in a number $N_1$ of cells and signals for the transmission of analog audio signals $S_2$ in a number $N_2$ of cells and
a device configured to introduce a delay into the analog audio signal $S_2$, said transmitter further includes at least one of,
a lowpass filter at the receiver configured to filter the analog audio signal $S_2$,
a system configured to sample the analog audio signal $S_2$, and
a device configured to obtain a compression of a dynamic range of the analog audio signal $S_2$;
a receiver, wherein said receiver includes,
a device configured to differentiate, in a received signal Sr, between at least the digitized audio signal $S_1$ and the analog audio signal $S_2$,
a device configured to determine that the digitized audio signal $S_1$ is in decodable form, and
a device configured to replace the digitized audio signal $S_1$, which is not in decodable form, with the analog audio signal $S_2$.

9. A radio broadcasting system comprising including at least one modem using a COFDM technique, said modem being represented in a time frequency space by several elementary cells comprising N available cells, at least one transmitter and at least one receiver, wherein the system comprises at least one of the following elements:
a transmitter, wherein said transmitter includes,
a device configured to distribute signals for transmission of a digitized audio signal $S_1$ in a number $N_1$ of cells and signals for the transmission of analog audio signals $S_2$ in a number $N_2$ of cells;
a receiver, wherein said receiver includes,
a device configured to differentiate, in a received signal Sr, between at least the digitized audio signal $S_1$ and the analog audio signal $S_2$,
a device configured to perform a windowing on the received signal Sr on a portion of the received signal that is supposed to be stable,
a device configured to determine if the digitized audio signal $S_1$ is in decodable form,
a device configured to replace the digitized audio signal $S_1$, which is not in decodable form, with the analog audio signal $S_2$, and
a device configured to perform processing operations on the analog audio signal $S_2$, wherein said processing operations include at least rejecting background noise.

10. The system according to any one of claims 7 to 9, wherein a number of cells $N_1$ ranges from 50% to 80% of the value of a number of free cells N in the modem for a frequency band of about 10 KHz.

11. The method according to claim 2, wherein the preprocessing steps further include lowpass filtering and sampling.

* * * * *